United States Patent
Donnelly et al.

(10) Patent No.: US 7,010,363 B2
(45) Date of Patent: Mar. 7, 2006

(54) ELECTRICAL APPLIANCE ENERGY CONSUMPTION CONTROL METHODS AND ELECTRICAL ENERGY CONSUMPTION SYSTEMS

(75) Inventors: Matthew K. Donnelly, Kennewick, WA (US); David P. Chassin, Pasco, WA (US); Jeffery E. Dagle, Richland, WA (US); Michael Kintner-Meyer, Richland, WA (US); David W. Winiarski, Kennewick, WA (US); Robert G. Pratt, Kennewick, WA (US); Anne Marie Boberly-Bartis, Alexandria, VA (US)

(73) Assignee: Battelle Memorial Institute, Richland, WA (US)

( * ) Notice: Subject to any disclaimer, the term of this patent is extended or adjusted under 35 U.S.C. 154(b) by 167 days.

(21) Appl. No.: 10/462,307

(22) Filed: Jun. 13, 2003

(65) Prior Publication Data

US 2004/0254654 A1    Dec. 16, 2004

(51) Int. Cl.
*G05B 11/01* (2006.01)
(52) U.S. Cl. .............................. 700/19; 700/20; 700/22; 700/286; 700/291; 700/296; 700/297; 700/298; 702/60; 702/61; 702/62; 702/63; 323/299; 323/303; 137/387; 62/176.3
(58) Field of Classification Search ............... 700/12, 700/13–14, 19, 20, 22, 286, 291, 292, 293, 700/294, 295, 29.6, 297, 298; 702/60–63; 323/299–303; 137/387; 26/260; 62/176.3
See application file for complete search history.

(56) References Cited

U.S. PATENT DOCUMENTS

| | | | |
|---|---|---|---|
| 2,238,624 A | | 4/1941 | Clark |
| 4,090,088 A | * | 5/1978 | McMahon et al. ............ 307/38 |
| 4,135,101 A | | 1/1979 | Young et al. |
| 4,213,058 A | | 7/1980 | Townsend |
| 4,317,049 A | | 2/1982 | Schweppe |
| 4,449,178 A | | 5/1984 | Blau, Jr. et al. |
| 4,472,640 A | | 9/1984 | Elmer |

(Continued)

FOREIGN PATENT DOCUMENTS

CA        2082914        1/1999

(Continued)

OTHER PUBLICATIONS

"Distribution Automation;" http://www.dt2003.events.pennet.com/confrence_program.cfm; Feb. 2-4, 2003; 20 pps.

(Continued)

*Primary Examiner*—Ramesh Patel
(74) *Attorney, Agent, or Firm*—Wells St. John, P.S.

(57) ABSTRACT

Electrical appliance energy consumption control methods and electrical energy consumption systems are described. In one aspect, an electrical appliance energy consumption control method includes providing an electrical appliance coupled with a power distribution system, receiving electrical energy within the appliance from the power distribution system, consuming the received electrical energy using a plurality of loads of the appliance, monitoring electrical energy of the power distribution system, and adjusting an amount of consumption of the received electrical energy via one of the loads of the appliance from an initial level of consumption to an other level of consumption different than the initial level of consumption responsive to the monitoring.

104 Claims, 6 Drawing Sheets

U.S. PATENT DOCUMENTS

| | | | |
|---|---|---|---|
| 4,644,320 A * | 2/1987 | Carr et al. | 340/310.06 |
| 4,835,706 A * | 5/1989 | Asahi | 700/293 |
| 4,868,412 A | 9/1989 | Owens | |
| 5,205,318 A | 4/1993 | Massaro et al. | |
| 5,220,807 A | 6/1993 | Bourne et al. | |
| 5,237,305 A * | 8/1993 | Ishikuro et al. | 340/286.01 |
| 5,436,510 A | 7/1995 | Gilbert | |
| 5,442,335 A | 8/1995 | Cantin et al. | |
| 5,523,631 A * | 6/1996 | Fishman et al. | 307/38 |
| 5,543,667 A | 8/1996 | Shavit et al. | |
| 5,544,036 A | 8/1996 | Brown, Jr. et al. | |
| 5,566,085 A | 10/1996 | Marceau et al. | |
| 5,625,236 A * | 4/1997 | Lefebvre et al. | 307/41 |
| 5,627,759 A | 5/1997 | Bearden et al. | |
| 5,638,297 A | 6/1997 | Mansour et al. | |
| 5,761,083 A | 6/1998 | Brown, Jr. et al. | |
| 5,762,266 A | 6/1998 | Okumura et al. | |
| 5,927,598 A * | 7/1999 | Broe | 236/46 R |
| 5,942,026 A | 8/1999 | Erlichman et al. | |
| 5,956,462 A | 9/1999 | Langford | |
| 5,959,368 A * | 9/1999 | Kubo et al. | 307/18 |
| 6,046,513 A | 4/2000 | Jouper et al. | |
| 6,067,482 A * | 5/2000 | Shapiro | 700/286 |
| 6,157,008 A * | 12/2000 | Brown et al. | 219/486 |
| 6,269,274 B1 | 7/2001 | Steinman et al. | |
| 6,278,909 B1 | 8/2001 | Thibeault et al. | |
| 6,314,378 B1 | 11/2001 | Hodge et al. | |
| 6,348,777 B1 | 2/2002 | Brown et al. | |
| 6,477,063 B1 * | 11/2002 | Ishii et al. | 363/21.04 |
| 6,487,509 B1 | 11/2002 | Aisa | |
| 6,493,643 B1 | 12/2002 | Aisa | |
| 6,553,418 B1 | 4/2003 | Collins et al. | |
| 6,624,532 B1 | 9/2003 | Davidow et al. | |
| 6,633,823 B1 | 10/2003 | Bartone et al. | |
| 6,772,052 B1 | 8/2004 | Amundsen et al. | |
| 6,832,135 B1 * | 12/2004 | Ying | 700/295 |
| 6,861,956 B1 * | 3/2005 | Ying | 340/825.69 |
| 6,862,498 B1 * | 3/2005 | Davis et al. | 700/295 |
| 2002/0072868 A1 | 6/2002 | Bartone et al. | |
| 2003/0050737 A1 * | 3/2003 | Osann | 700/276 |
| 2003/0233201 A1 | 12/2003 | Horst et al. | |
| 2004/0078153 A1 | 4/2004 | Bartone et al. | |
| 2004/0095237 A1 * | 5/2004 | Chen et al. | 340/506 |
| 2004/0186671 A1 | 9/2004 | Golder et al. | |
| 2004/0190211 A1 | 9/2004 | Ockert et al. | |
| 2005/0120492 A1 * | 6/2005 | Koo et al. | 8/159 |

FOREIGN PATENT DOCUMENTS

| | | |
|---|---|---|
| CA | 2 354 242 A1 | 12/2002 |
| EP | 0 372 961 A3 | 6/1990 |
| EP | 0 597 322 A3 | 5/1994 |
| EP | 1 372 238 A1 | 12/2003 |
| GB | 2361 114 A | 10/2001 |
| GB | 2361 118 B | 5/2002 |
| JP | 2003-149272 | 5/2003 |
| WO | WO 89/08342 | 9/1989 |
| WO | WO 99/52194 | 10/1999 |
| WO | WO 01/01542 A1 | 1/2001 |
| WO | WO 02/07365 A2 | 1/2002 |
| WO | WO 02/069471 A1 | 9/2002 |
| WO | WO 03/001645 A2 | 1/2003 |
| WO | WO 03/008983 A2 | 1/2003 |

OTHER PUBLICATIONS

"Pay-For-Performance;" http://www.honeywellcannon.com/Designs/Pay-for-Performance.asp; Mar. 19, 2004; 3 pps.

"Demand Response - Direct Control;" http://www.cannontech.com/products/drdirectcontrol.asp; Mar. 19, 2004; 3 pps.

"SuperStar ™"; www.comverge-tech.com/sustat.html; 2002; 1 pp.

"Demand Response - Direct Control"; www.cannontech.com/products/drdiretcontrol.asp; Nov. 19, 2003; 3 pps.

"What is TWACS"; www.twacs.com; Jun. 23, 2003; 2 pps.

"LCR 5000"; www.honeywellcannon.com/Products/LCR 5000.html; Jun. 23, 2003; 3 pps.

"The Yukon System"; www.honeywellcannon.com/prducts/Yukon.html; Jun. 23, 2003; 7 pps.

U.S. Appl. No. 10/461,137; Filed Jun. 13, 2003; "Electrical Power Distribution Control Methods, Electrical Energy Demand Monitoring Methods, and Power Management Devices"; Chassin et al.

"Fast load shedding for angle stability control;" Rovnyak, S.M.; Kejun Mei; Guang Li; Power Engineering Society General Meeting, 2003, IEEE, vol.: 4, Jul. 13-17, 2003; pps.:2275-2279.

"The status of demand response in New York;" Lawrence, D.I.; Neenan, B.F.; Power Engineering Society General Meeting, 2003, IEEE, vol.: 4, Jul. 13-17, 2003; pp.:2270-2274.

"Load response and system reliability situations;" Burke, R.B.; Henderson, M.I.; Platts, J.E.; Power Engineering Society General Meeting, 2003, IEEE, vol.: 4, Jul. 13-17, 2003; pp.:2285-2288.

"Demand side response 21st century style;" Covino, S.; Power Engineering Society General Meeting, 2003, IEEE, vol.: 4, Jul. 2003, pp.:2280-2284.

"Considerations for load as a virtual generator for grid security;" Kchler, J.H.;Power Engineering Society General Meeting, 2003, IEEE, vol.: 4 , Jul. 2003; pp.:2289-2292.

"News & Events - Papers & Panels;" http://www.cannontech.com/news/papers.asp; Mar. 19, 2004; 3 pps.

"Statistical Mechanics: A Possible Model for Market-based Electric Power Control;" D.P. Chasin; Pacific Northwest National Laboratory; Jan. 2004; pp. 1-10.

"Power Market Dynamics: The Statistical Mechanics of Transaction-Based Control;" D.P. Chasin; Pacific Northwest National Laboratory; Jun. 30-Jul. 2, 2003; pps. 573-582.

"End-Use Load Control for Power System Dynamic Stability Enhancement;" Dagle et al., U.S. Dept. of Energy under Contract DE-AC06-76RLO 1830; Pacific Northwest National Laboratory; Feb. 1997; 50 pps.

"Passive vs. Active Demand Response in Today's Marketplace;" Douglas Backer; Cannon Technologies, Inc.; Feb. 4, 2003; 7 pps.

"What is Energy Star?"; www.energystar.gov/index.cfm?c=about.ab_index.html; Apr. 16, 2003; 2 pps.

"ExpressStat Programmable Demand Response Thermostat;" www.honeywellcannon.com/Products/ExpressStat.html; Jun. 23, 2003; 2 pp.

"Mass Market Pay-for-Performance Incentive Plane;" Cannon Technologies; Mar. 19, 2004; pps. 1-10.

"Smart Load Control and Grid-Friendly Appliances"; Kintner-Meyer; Program Advisory Committee (PAC) of the project and CEC staff on Oct. 23, 2001; 7 pps.

Mass Market Pay-for-Performance Demand Response - Price -Based DR Programs with "No Interval Metering Required;" Backer, Doug; EnergyPulse.net; Feb. 18, 2003; 3 pps.

PCT/US2004/018333: Oct. 28 2004; International Search Report.

PCT/US2004/018332; Nov. 22, 2004; International Search Report.

U.S. Appl. No. 60/450,417, filed Feb. 26, 2003, Ockert et al.
U.S. Appl. No. 60/485,435, filed Jul. 8, 2003, Cannon et al.
U.S. Appl. No. 60/496,532, filed Aug. 20, 2003, Wallace et al.

* cited by examiner

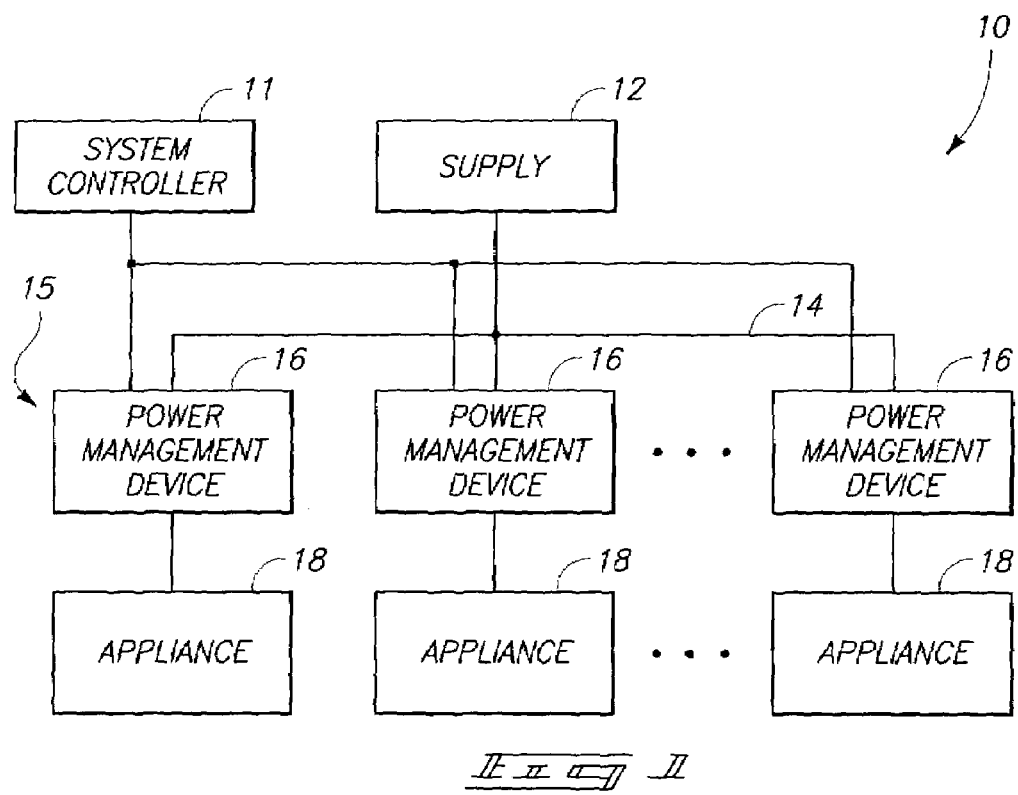
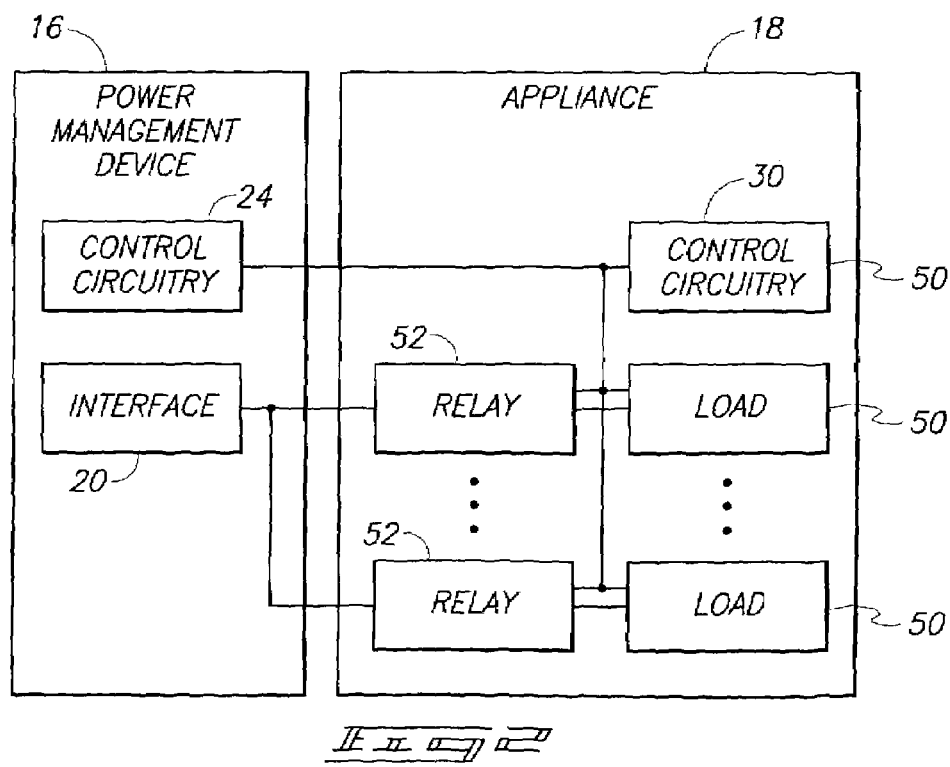

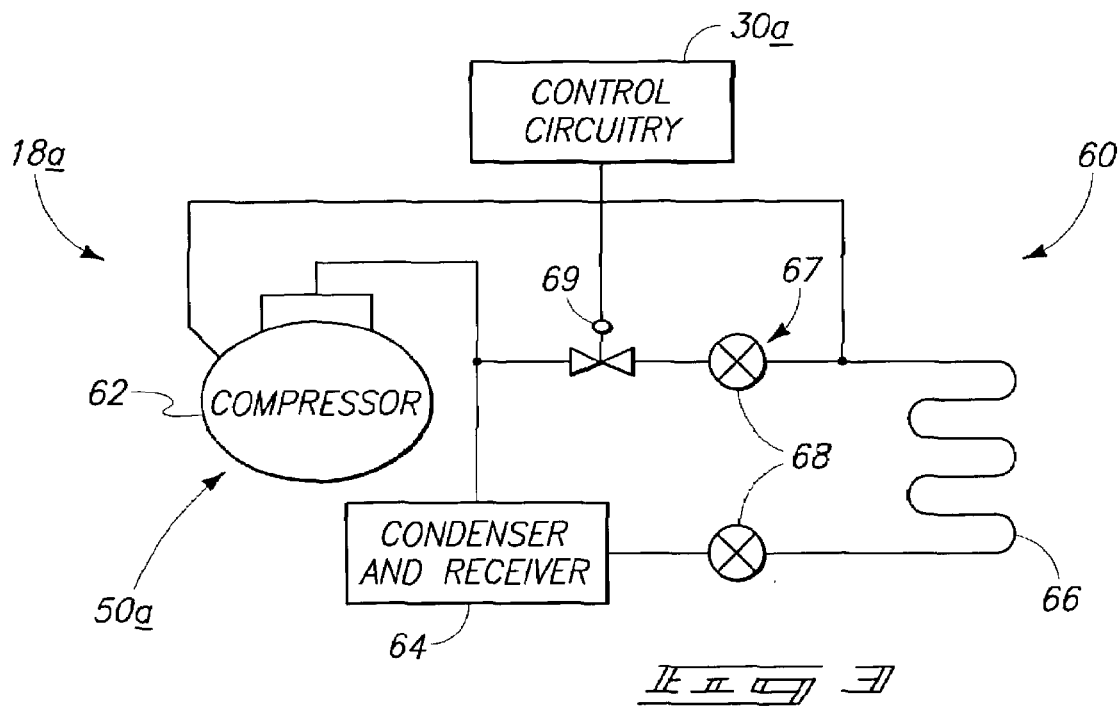
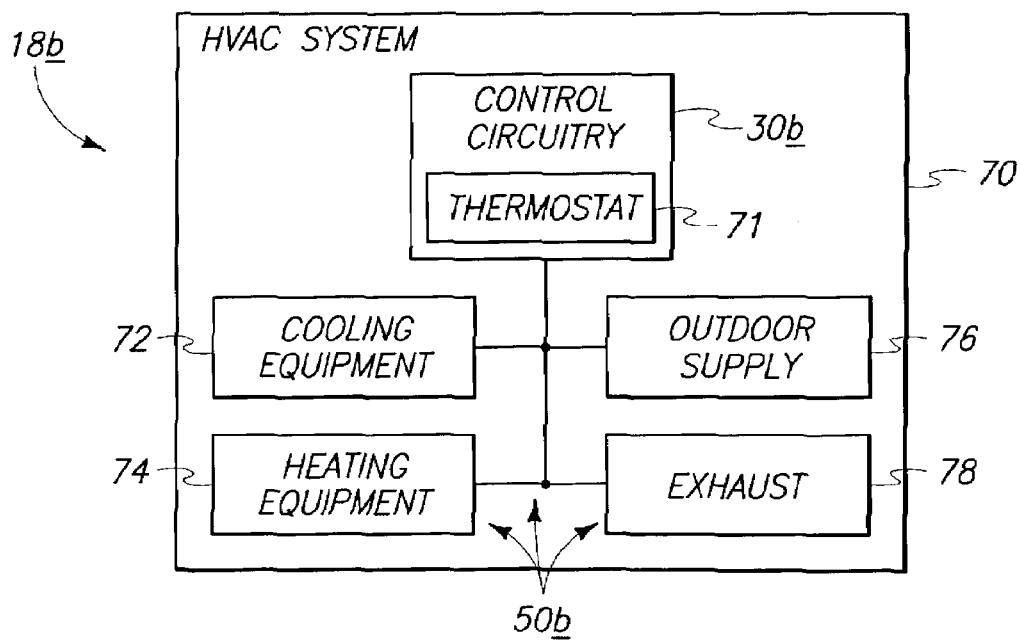

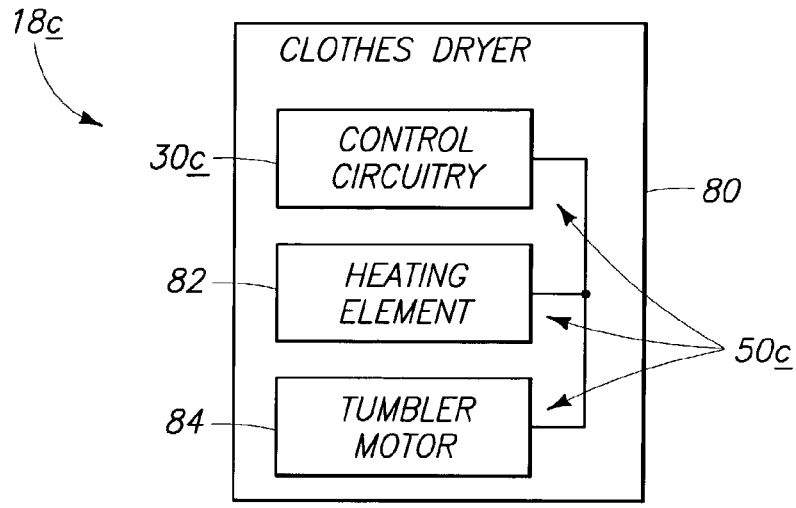
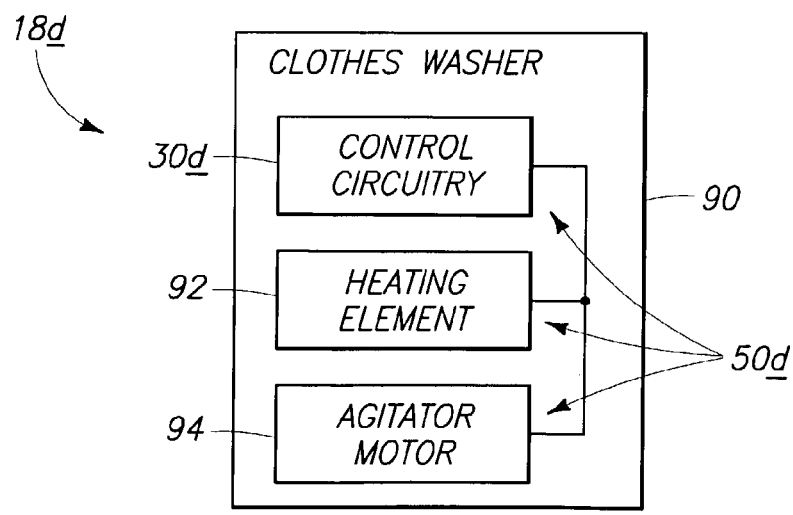

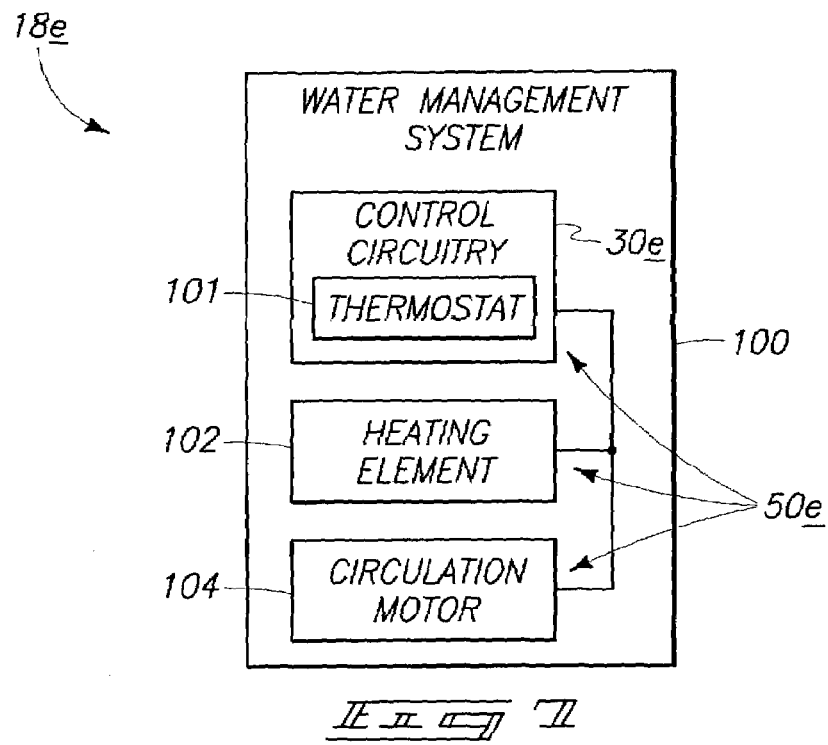
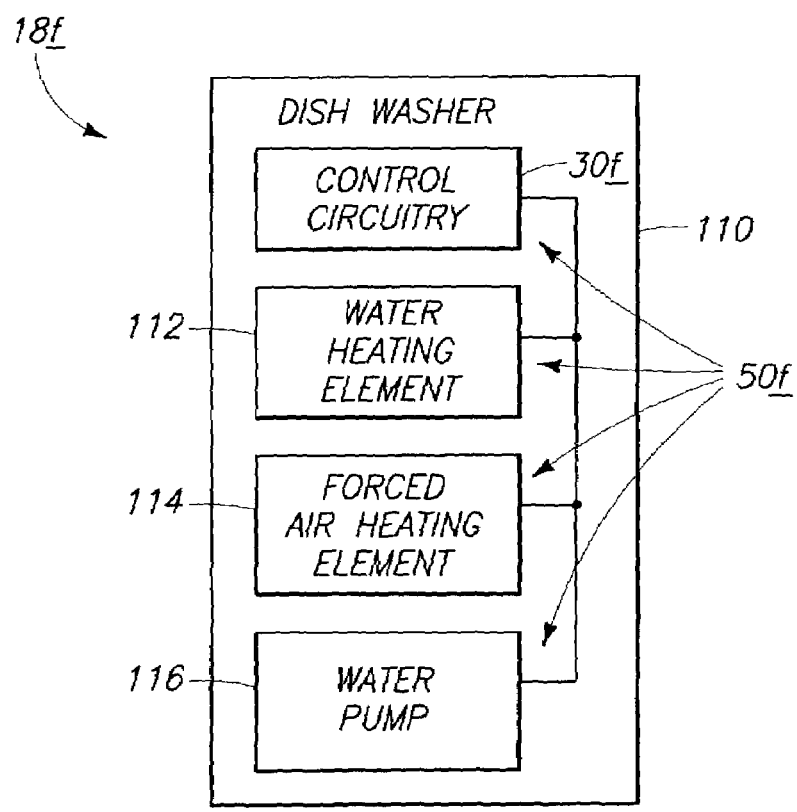

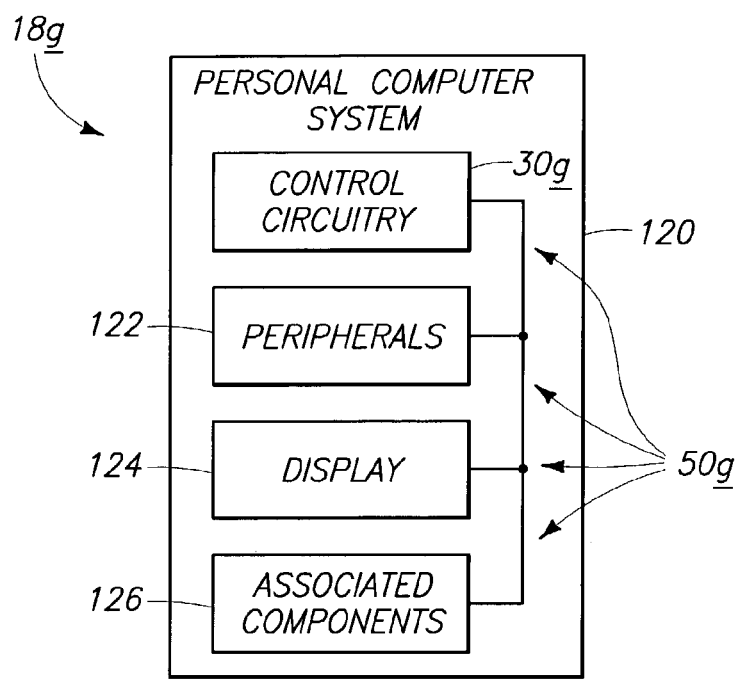
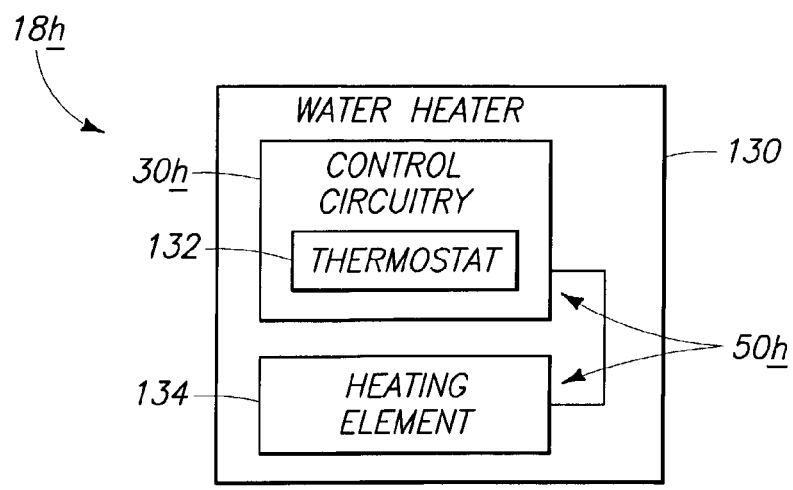

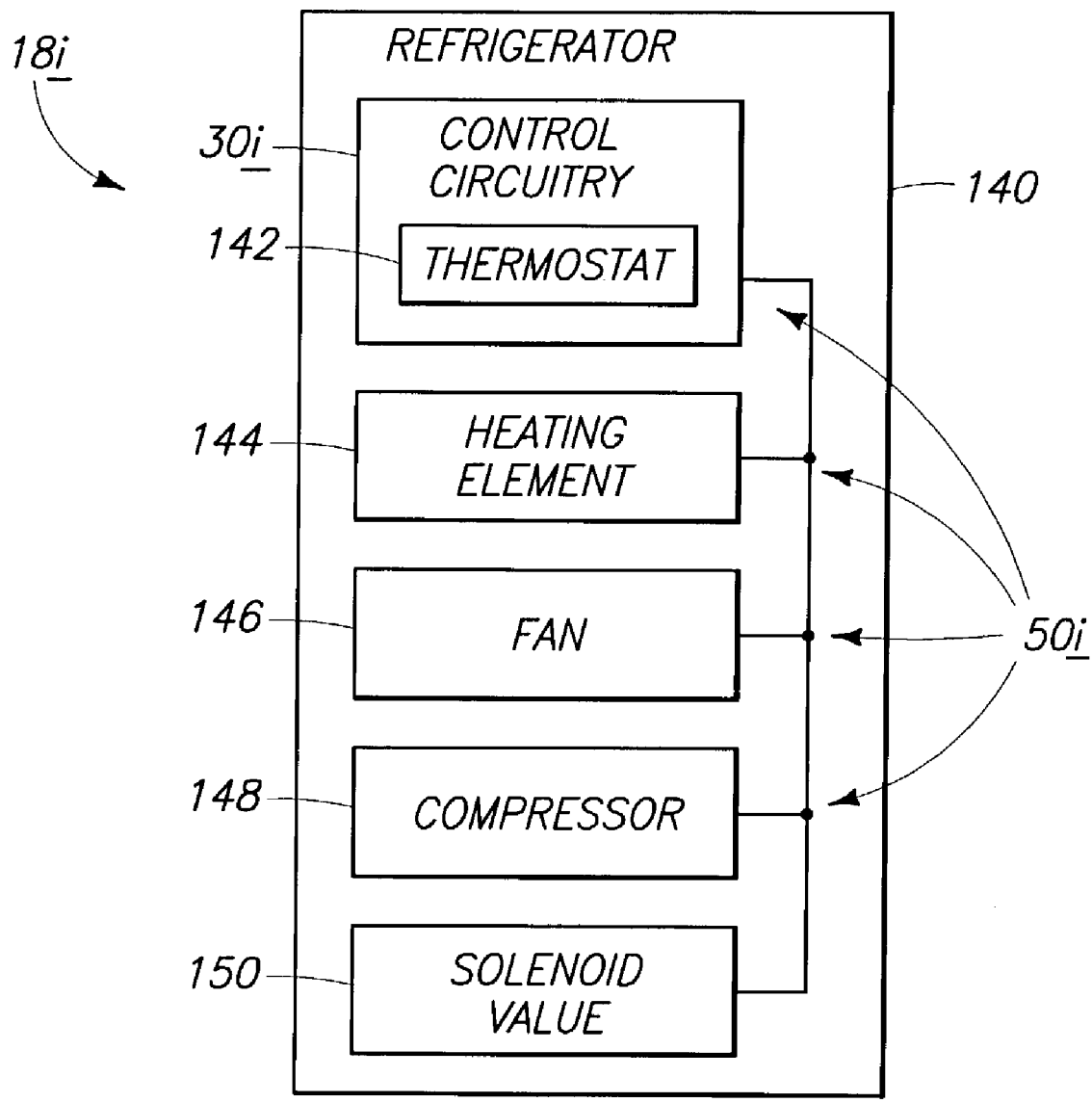

ELECTRICAL APPLIANCE ENERGY CONSUMPTION CONTROL METHODS AND ELECTRICAL ENERGY CONSUMPTION SYSTEMS

STATEMENT OF GOVERNMENT RIGHTS

This invention was made with Government support under contract DE-AC0676RLO1830 awarded by the U.S. Department of Energy. The Government has certain rights in the invention.

TECHNICAL FIELD

This invention relates to electrical appliance energy consumption control methods and electrical energy consumption systems.

BACKGROUND OF THE INVENTION

Consumption of and reliance upon electrical energy is increasing. Usage of electrical energy is ubiquitous in almost every aspect of life. Businesses, entertainment, communications, etc. are heavily dependent upon electrical energy for fundamental operation. Power distribution systems or grids provide electrical energy to households, businesses, manufacturing facilities, hospitals, etc. Such systems are typically reliable, however, numerous systems employ backup electrical supplies in case of failure of the power distribution system being utilized.

Some electrical power distribution systems are ever-changing dynamic systems and operations are often concerned with balancing generation with load. Frequency of the voltage of the electrical energy may be used as an indicator of variances between generation of electrical energy and usage of electrical energy by loads coupled with the electrical power distribution system. For example, when demand exceeds generation, the frequency of the electrical energy on the electrical power distribution system may drop, and conversely, when there is excess electrical energy available, the frequency increases. Over a given 24 hour period, it is desired to balance energy surplus and deficit so the average frequency is 60 Hz, or other desired frequency.

Typically, control of the state of the electrical power distribution system is implemented by controlling operations of generators coupled with the system. For example, at times of increased demand, the output of generators may be increased and/or other generators may be brought on-line to assist with supplying the electrical energy. In addition, spinning reserves may be utilized to accommodate unexpected significant fluctuations in demand for electrical energy. Provision of spinning reserves is costly, and much of the time, not used.

Some electrical power distribution approaches have been designed to curtail peak loads through the utilization of Demand Side Management (DSM). DSM techniques include direct load control wherein a utility has the ability to curtail specific loads as conditions warrant. In these arrangements, a utility may broadcast a control signal to specific loads when curtailment is desired (e.g., during peak usage periods).

Other electrical power distribution approaches attempt to stabilize bulk-power transmission corridors using external Flexible AC Transmission System (FACTS) devices to improve dynamic performance of transmission systems. FACTS devices, such as Static-Var Compensation (SVC) and Thyristor-Controlled Series Capacitors (TSCSs), are designed to provide stability enhancements allowing transmission facilities to be loaded to levels approaching their ultimate thermal capacity. These devices may supply reactive power to support voltage or provide modulation to damp electromechanical oscillations.

Utilities may use other devices at distribution points (e.g., substations and/or switchyards) to manage electrical power distribution operations. Exemplary management devices include underfrequency and undervoltage relays. These devices may "black out" entire neighborhoods when a grid is in trouble allowing the grid to recover before power is reapplied to the blacked out customers.

Aspects of the present invention provide improved apparatus and methods for supplying electrical energy.

BRIEF DESCRIPTION OF THE DRAWINGS

Preferred embodiments of the invention are described below with reference to the following accompanying drawings.

FIG. 1 is a functional block diagram of an electrical power distribution system according to one embodiment.

FIG. 2 is a functional block diagram illustrating a power management device and an appliance according to one embodiment.

FIG. 3 is a functional block diagram of a temperature management system according to one embodiment.

FIG. 4 is a functional block diagram of an HVAC system according to one embodiment.

FIG. 5 is a functional block diagram of a clothes dryer according to one embodiment.

FIG. 6 is a functional block diagram of a clothes washer according to one embodiment.

FIG. 7 is a functional block diagram of a water management system according to one embodiment.

FIG. 8 is a functional block diagram of a dish washer according to one embodiment.

FIG. 9 is a functional block diagram of a personal computer system according to one embodiment.

FIG. 10 is a functional block diagram of a water heater according to one embodiment.

FIG. 11 is a functional block diagram of a refrigerator according to one embodiment.

DETAILED DESCRIPTION OF THE PREFERRED EMBODIMENTS

According to one aspect of the invention, an electrical appliance energy consumption control method includes providing an electrical appliance coupled with a power distribution system, receiving electrical energy within the appliance from the power distribution system, consuming the received electrical energy using a plurality of loads of the appliance, monitoring electrical energy of the power distribution system, and adjusting an amount of consumption of the received electrical energy via one of the loads of the appliance from an initial level of consumption to an other level of consumption different than the initial level of consumption responsive to the monitoring.

According to another aspect of the invention, an electrical appliance energy consumption control method comprises providing an electrical appliance coupled with a power distribution system, the appliance comprising a plurality of loads, receiving electrical energy within the appliance from the power distribution system, operating the appliance at a normal mode of operation wherein one of the loads consumes a first amount of electrical energy, monitoring an electrical characteristic of electrical energy of the power distribution system, and responsive to the monitoring, operating the appliance at an other mode of operation wherein the one of the loads consumes a second amount of electrical energy different than the first amount of electrical energy.

According to another aspect of the invention, an electrical energy consumption system comprises a power interface configured to receive electrical energy of the power distribution system, a plurality of loads coupled with the power interface and configured to consume the received electrical energy, and control circuitry configured to monitor an electrical characteristic of the electrical energy of the power distribution system and to vary an amount of consumption of the received electrical energy via one of the loads responsive to the monitoring.

Additional aspects are described herein. For example, additional aspects relate to compressor systems, HVAC systems, clothes dryers, clothes washers, water management systems, dish washers, personal computer systems (or other devices having energy saving modes of operation), water heaters, refrigerators, and any other appliance configuration configured to consume electrical energy during operation.

Referring to FIG. 1, an electrical power distribution system 10 is shown arranged according to one exemplary illustrative embodiment. System 10 comprises any appropriate electrical energy delivery system configured to deliver residential, commercial, industrial, or other electrical energy from a supply to customers or consumers. The depicted exemplary system 10 comprises a system controller 11, an electrical energy supply 12, a distribution grid 14, and an exemplary power management system 15 comprising a plurality of power management devices 16 and/or appliances 18. A plurality of electrical appliances 18 are depicted coupled with the electrical power distribution system 10 and are configured to consume electrical energy provided from supply 12. In some embodiments, appliances 18 may be considered to be a part of system 10 (e.g., in configurations wherein power management operations are implemented using associated control circuitry of the appliances as described in exemplary embodiments below).

System controller 11 is configured as control circuitry to monitor and manage operations of system 10 in some embodiments. System controller 11 may comprise a microprocessor in one embodiment to implement exemplary monitoring and control aspects of the power management operations described herein. System controller 11 may be referred to as a centralized controller in one embodiment and for example operated by supply 12 or at some location distant from consumers. In one arrangement, system controller 11 is configured to monitor electrical energy distributed within system 10 and issue appropriate control signals to power management devices 16 and/or appliances 18 (e.g., via networked, wired or wireless communications) to implement power management operations described herein. Implementation of power management operations by system controller 11 configured in the above-identified centralized embodiment may be referred to as centralized operations.

Implementation of power management operations at customer locations (e.g., residential, commercial, industrial, etc.) may be referred to as passive operations. For example, power management devices 16 and/or appliances 18 may implement some or all of the power management operations (e.g., monitoring, control) at the customer locations with or without a centralized system controller 11. In other embodiments, system controller 11 may comprise a customer located device to provide passive operations (e.g., mounted locally to provide, monitor and/or control passive operations of devices 16 and/or appliances 18 at the customer location). Accordingly, in at least some exemplary embodiments, system controller 11 provides centralized or passive power management operations described herein. In some embodiments and as mentioned above, controller 11 may be omitted and power management operations may be implemented within devices 16 and/or appliances 18.

Supply 12 is configured to provide electrical energy for consumption by appliances 18. Supply 12 may be arranged as one or more generator or other construction configured to supply electrical energy. Generators may be individually taken on-line or off-line, or the output thereof may be adjusted, according to the usage of the electrical energy. In one exemplary implementation, supply 12 is arranged to provide alternating current electrical energy at a system frequency of 60 Hz. System frequency is the frequency of system voltage.

Distribution grid 14 operates to conduct the electrical energy from the supply 12 to appropriate destinations for consumption. In one embodiment, distribution grid 14 may comprise a plurality of different voltage distribution lines and transformers configured to conduct the electrical energy over substantial distances between distant geographical locations. Distribution grid 14 may provide electrical energy at exemplary voltages of 120/240 VAC (residential), 120/208 VAC (commercial), 277/480 VAC (industrial) or other appropriate voltages for usage by customer appliances 18 in one example.

Power management devices 16 are configured to selectively apply electrical energy from supply 12 to respective appliances 18 as described below. In the exemplary depicted implementation, all of the illustrated appliances 18 have associated power management devices 16. In other configurations, only some of the appliances 18 may have associated power management devices 16. In other arrangements, a given device 16 may be configured to control power management operations of a plurality of appliances 18.

Power management operations may be implemented in variety of configurations. For example, in the centralized arrangement, system controller 11 comprises control circuitry configured to monitor electrical energy of system 10 and issue control signals to devices 16 and/or appliances 18 to control the application of electrical energy to appliances 18. In passive arrangements, system controller 11 may be omitted, and adjustment of the supply of electrical energy may be implemented by individual devices 16 responsive to internal monitoring by devices 16 of electrical energy of system 10. Some embodiments of system 11 may include centralized and passive power management operations. In the described exemplary embodiments, power management operations include monitoring of electrical energy from supply 12 and adjusting (e.g., reducing) an amount of electrical energy consumed by respective appliances.

In at least one embodiment, system controller 11, power management devices 16, and/or appliances 18 are configured to monitor at least one characteristic of the electrical energy provided from supply 12 and control a mode of operation of one or more associated appliance load coupled therewith. In one embodiment, system frequency of the electrical energy is monitored and the amount of electrical energy consumed by a respective appliance 18 may be adjusted responsive to the monitoring. For example, in one operational implementation, power management devices 16 may reduce an amount of electrical energy supplied to respective appliances 18 responsive to detection of a drop in system frequency of the electrical energy provided by supply 12. Monitoring operations and control operations may be split between controller 11, respective device 16, and/or respective appliance 18. One or more of controller 11, device 16, or control circuitry of appliance 18 may be omitted and the existing control circuitry provides monitoring and control operations. In some arrangements, both the monitoring and control operations may be provided by one of controller 11, respective device 16, or respective appliance 18.

In the exemplary illustrated embodiment, system controller 11 and/or power management devices 16 are depicted separate from appliances 18. In other possible embodiments, system controller 11 and/or power management devices 16 may be at least proximately located to the respective appliances 18, physically positioned adjacent to or physically coupled with the respective appliances 18, and/or embedded within the appliances 18 (e.g., providing the power management devices 16 within housings of the appliances 18).

In one arrangement (e.g., passive arrangement), power management devices 16 are configured to monitor a condition of electrical energy of the system 10 to implement power management operations. In one embodiment, device 16 monitors the electrical energy at a node used to supply electrical energy from grid 14 to appliance 18. The node may be implemented using a customer wall outlet or other suitable local connection for coupling the appliance 18 to the grid 14. In one arrangement, system controller 11 may correspond to a physical customer location (e.g., residence, commercial location, industrial location, etc.) configured to interact with one or more appliance 18 of the customer location as mentioned previously. System controller 11 may monitor electrical energy supplied by supply 12 and distributed by distribution grid 14. System controller 11 may output control signals to device(s) 16 and/or appliance(s) 18 to selectively control the operations thereof in modes of reduced power consumption responsive to the monitoring.

It is possible to implement power management operations (e.g., monitor and/or control operations) described herein (or other operations of control circuitry 24 of device 16 described below) using control circuitry of an electrical appliance 18 itself (e.g., control circuitry 30 described below) and configured to control operations with respect to the electrical appliance 18. These implementations are exemplary and other implementations or operations are possible.

Appliances 18 may have any configuration which consumes supplied electrical energy. Appliances 18 may also be referred to as motors or utilization equipment. A plurality of power management devices 16 are arranged to control respective appliances 18. In other embodiments, one device 16 may be implemented to control consumption of electrical energy of a plurality of appliances 18 as mentioned above.

Further exemplary details regarding electrical power distribution system 10, power management devices 16, and power management operations including controlling operations of appliances 18 or other loads according to some embodiments are described in a U.S. Patent Application entitled "Electrical Power Distribution Control Methods, Electrical Energy Demand Monitoring Methods, And Power Management Devices", having client docket no. B1367, listing David P. Chassin, Matt Donnelly, and Jeff Dagle as inventors, and the teachings of which are incorporated herein by reference.

Referring to FIG. 2, additional details regarding power management device 16 and appliance 18 according to one possible embodiment are presented. The power management device 16 and associated appliance 18 may be referred to as an electrical energy consumption system.

The depicted power management device 16 includes an interface 20 and control circuitry 24. Interface 20 is arranged to receive operational electrical energy for consumption using the respective appliance 18. Interface 20 may be referred to as a power interface and comprise the node described above. Interface 20 may be implemented using a wall outlet adapter able to receive supplied residential, commercial, industrial, or other electrical energy in exemplary configurations. Control circuitry 24 may be embodied as a microprocessor or other appropriate control architecture.

The depicted exemplary appliance 18 comprises control circuitry 30, a plurality of associated loads 50, and a plurality of relays 52. Control circuitry 30 may be implemented as a microprocessor or other appropriate control architecture and may also comprise an associated load 50. Associated loads 50 consume electrical energy. Relays 52 selectively supply electrical energy power from grid 14 to respective loads 50. In other configurations, a single relay 52 may supply electrical energy to a plurality of loads 50 of a given appliance 18. Other configurations for controlling the application of electrical energy from interface 20 to load(s) 50 are possible.

Power management device 16 may be configured according to the exemplary device arrangements described in the incorporated patent application. Power management device 16 is arranged in one embodiment as a discrete device separate from the appliance 18 as mentioned above. Alternately, power management device 16 may be implemented entirely or partially using existing components of the appliance 18. For example, functionality of control circuitry 24 may be implemented using control circuitry 30 to monitor electrical energy of power distribution system 10 and to control consumption of electrical energy by one or more of loads 50 responsive to the monitoring. As described in the incorporated patent application, a relay (or other switching device not shown in FIG. 2) internal of device 16 may be used to adjust the amount of electrical energy consumed by appliance 18. Control circuitry 24 and/or control circuitry 30 may be arranged to control the operations of the associated relay (not shown) of device 16. As shown, appliance 18 may comprise associated relays 52 which may be controlled by control circuitry 24 and/or control circuitry 30. Switching device configurations other than the described relays may be used.

In other arrangements, control circuitry 24 may provide control signals to control circuitry 30 or directly to loads 50 to control the rate of consumption of electrical energy by loads 50 without the use of relays 52 (accordingly relays 52 may be omitted). Responsive to the received control signals, control circuitry 30 may operate to control respective loads 50, or loads 50 may internally adjust rates of consumption of the electrical energy responsive to directly receiving the control signals from circuitry 24 or 30.

According to the specific arrangement of the appliance 18 being controlled, aspects described herein, including monitoring of electrical energy of system 10 and/or controlling the consumption of power within appliance 18, may be implemented using circuitry internal and/or external of the appliance 18. The discussion herein proceeds with respect to exemplary configurations wherein monitoring and control operations are implemented by control circuitry 30. Any alternate configurations may be used to implement functions and operations described herein.

Appliances 18 comprise devices configured to consume electrical energy. Exemplary appliances 18 described below include temperature maintenance systems, HVAC systems, clothes dryers, clothes washers, water management systems (e.g., spa and/or pool), dish washers, personal computer systems, water heaters, and refrigerators. The described appliances 18 are exemplary for discussion purposes and other arrangements are possible.

As shown in the exemplary arrangement of FIG. 2, appliances 18 may individually comprise a plurality of different associated loads 50 individually configured to consume electrical energy. For example, for a given appliance 18, one of loads 50 may be a control load wherein processing is implemented (e.g., 3–5 Volt circuitry of control circuitry 30) and another of the loads 50 may be a higher voltage load including exemplary motors, heating coils, etc.

Consumption of electrical energy by such appliances 18 may be adjusted by turning off (or otherwise adjusting the operation of one associated load 50 while leaving another associated load 50 powered (or otherwise unaffected). During exemplary power management operations, it may be desired adjust an amount of electrical energy applied to one of the associated loads 50 of a given appliance 18 (e.g., a high power associated load) while continuing to provide full (or otherwise unadjusted) amount of electrical energy to another of the associated loads 50 of the given appliance 18 (e.g., a low power associated load). Alternately, power may be adjusted, reduced or ceased for all associated loads all together.

Adjustment of the consumption of electrical energy by an appliance 18 may be implemented responsive to monitoring by appropriate control circuitry of electrical energy of power distribution system 10. In one embodiment, a characteristic (e.g., system frequency) of the electrical energy is monitored. The incorporated patent application provides exemplary monitoring operations of system frequency (e.g., voltage) of electrical energy supplied by power distribution system 10. Other characteristics of electrical energy of system 10 may be monitored in other constructions.

Responsive to the monitoring, appropriate control circuitry is configured to adjust an amount of consumption of electrical energy within at least one of the loads 50 from an initial level of consumption to an other different level of consumption. For example, as described in the incorporated application, if the system frequency of the electrical energy deviates a sufficient degree from a nominal frequency, a threshold is triggered. As described in the incorporated application, the threshold may be varied at different moments in time (e.g., responsive to power-up operations of appliance 18 at different moments in time). In one embodiment, the varying of the threshold is random.

Appropriate control circuitry may adjust an amount of consumption of electrical energy (e.g., via one of loads 50) from an initial level to an other different level (e.g., reduced consumption mode) responsive to the threshold being triggered. Thereafter, the control circuitry continues to monitor the electrical energy. If the frequency returns to a desired range, the control circuitry may return the operation of the appliance 18 and load(s) 50 to a normal mode of operation (e.g., a mode wherein an increased amount of electrical energy is consumed). As described in the incorporated patent application, a variable length of time may be used to return the consumption to the initial level and the variable length of time may be randomly generated in at least one embodiment.

Accordingly, the appropriate control circuitry may control operation of the adjusted load 50 for a period of time at the adjusted level of electrical energy consumption. During the adjustment, the control circuitry may maintain the level of consumption of another load 50 of the appliance 18 at a normal level of consumption.

Some arrangements of power management device 16 permit override functionality. For example, the appropriate control circuitry may have associated user interface circuitry (not shown) usable by a user to disable power management operations via an override indication (e.g., hit a key of the user interface circuitry). Responsive to the reception of the override indication, the control circuitry may return the mode of operation of the affected load 50 to a normal consumption mode (e.g., wherein an increased amount of electrical energy is consumed compared with the level of consumption initiated during the power management operations).

Referring to FIGS. 3–11, exemplary configurations of appliances 18a–18i are shown. The figures depict exemplary appliances configured to implement power management operations. The illustrated appliances 18a–18i include respective control circuits 30a–30i. The control circuits 30a–30i may interface with system controller 11 and/or control circuitry 24 of power management device 16 (not shown in FIGS. 3–11) to implement power management operations in one embodiment. In other embodiments, power management operations may be implemented solely internally of the appliances 18a–18i using the respective control circuits 30a–30i. The described appliances 18a–18i are for illustration and other arrangements of the appliances are possible.

Referring specifically to FIG. 3, appliance 18a arranged as a compressor system is depicted. The depicted compressor system is arranged as a temperature management system 60 although other configurations which use a compressor are possible. An exemplary temperature management system 60 may include an air conditioner, heat pump, or other arrangement implementing load control strategies using electrically driven vapor compression cycles for heating, venting, air-conditioning, refrigeration or other applications. The exemplary system 60 includes a compressor 62, condenser and receiver 64, evaporator 66, short circuit path 67, expansion valves 68 and solenoid valve 69. Control circuitry 30a and compressor 62 comprise associated loads 50a of the depicted system 60. Compressor 62 is arranged to compress a fluid within the system, condenser 64 is configured to condense the fluid, and evaporator 66 is configured to evaporate the fluid in one embodiment.

In one embodiment, power management operations of system 60 use hot-gas bypass techniques to temporarily unload compressor 62. Control circuitry 30a may selectively control solenoid valve 69 to open short circuit path 69 and couple the suction line with the hot-gas line and bypass compressor 62 and evaporator 66 in a vapor compression cycle. This technique provides capacity control and reduces a starting and stopping duty cycle of compressor 62. The operations may be implemented without unduly burdening an electric motor (not shown) of compressor 62 with potentially damaging transients. In some embodiments, the short circuiting may be implemented for a few seconds and would most likely not be noticed by a consumer.

Referring to FIG. 4, appliance 18b arranged as an HVAC system 70 is shown. HVAC system 70 is configured in one embodiment to adjust a temperature of an associated area, such as an enclosed, controlled area (e.g., building, house, etc.). An exemplary HVAC system 70 may include control circuitry 30b, a thermostat 71 (e.g., embodied within control circuitry 30b), cooling equipment 72 (e.g., air conditioning assembly, heat pump, etc.), heating equipment 74 (e.g., forced air, oil, steam, heat pump, etc.), outdoor supply 76

(e.g., fan, dampers), and exhaust 78 (e.g., fan, dampers). Control circuitry 30b, cooling equipment 72, heating equipment 74, outdoor supply 76 and exhaust 78 may comprise associated loads 50b of system 80.

In one embodiment, power management operations of system 70 and implemented by control circuitry 30b include adjusting a set point of thermostat 71. For example, during cooling operations, the thermostat set point may be temporarily raised, and for heating operations, the thermostat set point may be temporarily lowered. In other exemplary power management operations, control circuitry 30b may directly disable or provide other control of cooling and/or heating equipment 72, 74.

Additional power management operations include controlling fans or dampers of outdoor supply 76 or exhaust 78 using control circuitry 30b to provide desired configurations during operation in modes of reduced power consumption. The fans and dampers can be provided by circuitry 30b into desired configurations (fans on or off and/or dampers open or closed) with respect to building supply and exhaust operations. For configurations wherein a heat pump (not shown) is implemented within cooling and/or heating equipment 72, 74, control circuitry 30b may temporarily disable or cancel a defrost operation of the heat pump during power management operations. If disabled or canceled, control circuitry 30b may reschedule the defrost operation to another moment in time (e.g., in configurations wherein defrost operations are timer controlled).

Referring to FIG. 5, appliance 18c arranged as a clothes dryer 80 is shown. An exemplary clothes dryer 80 may include control circuitry 30c, a heating element 82, and a tumbler motor 84. Heating element 82 is configured in one embodiment to heat an associated compartment (not shown) of clothes dryer 80 configured to receive and dry clothes. Tumbler motor 84 is configured to spin clothes within the associated compartment during drying operations. Control circuitry 30c, heating element 82 and tumbler motor 84 comprise exemplary associated loads 50c of clothes dryer 80 in the depicted embodiment.

In one configuration, power management operations of clothes dryer 80 include reducing or ceasing the supply of electrical energy to heating element 82 (e.g., reducing an amount of current supplied to heating element 82) and/or tumbler motor 84. It may be desired to maintain tumbler motor 84 in an operative mode during an implementation of power management operations with respect to heating element 82.

Referring to FIG. 6, appliance 18d arranged as a clothes washer 90 is shown. An exemplary clothes washer 90 may include control circuitry 30d, a heating element 92, and an agitator motor 94. Heating element 92 is configured to heat water used in an associated compartment (not shown) of clothes washer 90 configured to receive and wash clothes. Agitator motor 94 is configured to oscillate between different rotational directions or otherwise agitate clothes within the associated compartment during wash and/or rinse operations. Control circuitry 30d, heating element 92 and agitator motor 94 comprise associated loads 50d of clothes washer 90 in the depicted embodiment.

In one configuration, power management operations of clothes washer 90 include reducing or ceasing the supply of electrical energy to heating element 92 to reduce internal temperatures of water in the associated compartment and/or agitator motor 94 to reduce motion of the motor 94. The reduction in power by controlling heating element 92 may be linear and accordingly the benefits may be directly proportional to the reduction in the water temperature. The reduction in power to agitator motor 94 may be proportional to a product of angular acceleration, mass and angular velocity. A slowing down of agitator motion of motor 94 could affect both a reduction in acceleration as the motor reverses its motion as well as angular velocity. In other embodiments, it may be desired to maintain agitator motor 94 in an operative mode during an implementation of power management operations with respect to heating element 92.

Referring to FIG. 7, appliance 18e arranged as a water management system 100 is shown. Water management system 100 is configured to provide heating, circulation and/or filtering of water within a water reservoir (not shown in FIG. 7) of a spa (hot tub), swimming pool, or other configuration in exemplary implementations. The illustrated configuration of water management system 100 includes control circuitry 30e (embodying a thermostat 101 in the depicted exemplary configuration), a heating element 102, and a circulation motor 104 (e.g., circulation and/or filter pump). Control circuitry 30e, heating element 102 and circulation motor 104 comprise associated loads 50e of system 100 in an exemplary configuration.

According to an illustrative embodiment, power management operations of system 100 implemented by control circuitry 30e include adjusting a set point of thermostat 101. For example, the thermostat set point may be temporarily lowered. In other exemplary power management operations, control circuitry 30e may directly disable or provide other control of heating element 102 and/or circulation motor 104. In specific exemplary arrangements, control circuitry 30e may adjust an amount of current provided to heating element 102, or control the angular velocity of motor 104 to adjust (e.g., reduce) water circulation operations of the spa, pool or other water reservoir during operation in modes of reduced power consumption. The power management operations are temporary in the described example, and accordingly, the operations are typically transparent to a user.

Referring to FIG. 8, appliance 18f arranged as an exemplary dish washer 110 is illustrated. Dish washer 110 includes control circuitry 30f, a water heating element 112, a forced air heating element 114, and a water pump 116 in but one embodiment. Dish washer 110 may additionally include a compartment (not shown) configured to receive to dishes. Water heating element 112 may adjust a temperature of water used to wash dishes using dish washer 110 in one embodiment. Forced air heating element 114 adjusts a temperature of air used to dry the dishes in one implementation. Water pump 116 may spray water on the dishes during a cleaning and/or rinsing cycle to provide a dish cleaning action and/or rinsing action. Control circuitry 30f, heating elements 112, 114, and water pump 116 may comprise associated loads 50f of dish washer 110.

Exemplary power management operations of dish washer 110 implemented by control circuitry 30f in one embodiment include controlling the water heater 112 to reduce a water temperature boost cycle during wash operations and/or reduce air temperature by forced air heater 114 during rinsing/drying operations. Reduction of water temperature provides corresponding linear reductions in electrical power consumption. Control circuitry 30f may also control operations of water pump 116 (e.g., reduce the operational speed of pump 116) during modes of reduced power consumption.

Referring to FIG. 9, appliance 18g arranged as an exemplary home and office system 120 is illustrated. System 120 includes at least one component or device configured to selectively operate in an energy saving mode (e.g., in accordance with Energy Star™) wherein a reduced amount of electrical energy is consumed by the device or component. Exemplary devices or components may enter such an energy saving mode without power management operations discussed herein in one embodiment. Other arrangements of system 120 apart from the exemplary depicted home and office system and which include at least one device or component configured to operate in an energy saving mode are possible.

As shown, system 120 comprises a personal computer system in the depicted example and includes a plurality of components including control circuitry 30g (e.g., personal computer microprocessor), peripherals 122 (e.g., laser printer), a display 124 (e.g., CRT), and other associated components 126 (e.g., fans, disk drives, etc.) which comprise associated loads 50g of appliance 18g in the depicted example.

At least some of loads 50g are configured to independently or dependently operate in a plurality of respective operational modes, including an energy saving mode wherein a reduced amount of electrical energy is consumed, in the described example. Control circuitry 30g is configured to implement exemplary power management operations including selectively providing individual ones or all loads 50g into the respective energy saving modes of operation (e.g., in addition to any other programming or criteria configured to provide such devices or components into the respective energy saving modes). For example, control circuitry 30g may enter an energy saving mode of operation having reduced clock speed. A peripheral 122 embodied as a laser printer may enter an energy saving mode wherein a laser printer heating element (e.g., toner fusing assembly) is configured to consume a reduced amount of electrical energy. Display 124 may enter an energy saving mode wherein a cathode ray tube is configured to consume a reduced amount of electrical energy. Control circuitry 30g may control any associated device or component of system 120 to enter an energy saving mode (if provided for the device or component) according to exemplary described aspects.

Referring to FIG. 10, appliance 18h configured as an exemplary water heater 130 is shown. Water heater 130 includes control circuitry 30h (embodying a thermostat 132 in the illustrated configuration) and a heating element 134. Heating element 134 is configured to heat water in an associated reservoir (not shown) to a desired temperature in the depicted configuration. Control circuitry 30h and heating element 134 comprise loads 50h of water heater 130 in one embodiment.

According to an illustrative embodiment, power management operations of system 130 and implemented by control circuitry 30h include adjusting a set point of thermostat 132. For example, the thermostat set point may be temporarily lowered (e.g., for a period of tens of seconds, or a few minutes in some examples). In other exemplary power management operations, control circuitry 30h may directly disable or provide other control of heating element 134.

According to additional exemplary aspects, a set point of any of the thermostats disclosed herein of the various appliances 18a–18g may be assigned to one of a plurality of possible power management set points according to a monitored condition of electrical energy of system 10. For example, a scale of set points may be used according to the condition of the electrical energy (e.g., the temperature set point may be decreased at predefined decrements (1–10 degrees for example) corresponding to the system frequency of the electrical energy deviating respective predetermined amounts (e.g., 10 mHz) from the nominal frequency. In accordance with the described example, the magnitude of adjustment of the thermostat set point increases as the deviation of the system frequency from the nominal frequency increases.

Referring to FIG. 11, appliance 18i configured as an exemplary refrigerator 140 is shown. The illustrated refrigerator 140 includes control circuitry 30i (embodying a thermostat 142), a heating element 144, a fan 146, a compressor 148, and a solenoid valve 150 in the depicted embodiment. Control circuitry 30i, heater 144, fan 146, and compressor 148 comprise exemplary loads 50i in the depicted example.

First exemplary power management operations of control circuitry 30i include adjustment of a temperature set point of thermostat 142. It may be desired in at least one embodiment to set a relatively short duration of any temperature adjustment during power arrangement operations. Another possible power management operation provides temporary disablement of defrost operations of heating element 144 (e.g., coupled with unillustrated coils of refrigerator 140), or adjusting a time of the defrost operations controlled by control circuitry 30i. In another arrangement, heating element 144 may be used to provide anti-sweat operations (e.g., appropriately positioned adjacent an exterior portion of an unillustrated cabinet of refrigerator 140—for example adjacent to a door) and power management operations may include temporary disablement of the anti-sweat operations or otherwise adjusting such operations to occur at another moment in time wherein power management operations are not being implemented. Additional exemplary power management operations include disablement of interior air circulation operations implemented by fan 146 and/or controlling operations of compressor 148 (e.g., including temporarily disabling or reducing the speed of compressor 148). Additional aspects include implementing a hot gas bypass operation of compressor 148 using solenoid valve 150 and as described in further detail above in one example. One other embodiment provides a multi-stage refrigerator 140 having a plurality of cooling stages and a power management operation includes controlling the refrigerator 140 to operate at less than the available number of cooling stages thereby reducing the amount of energy consumed by the appliance.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms, or modifications within the proper scope of the appended claims appropriately interpreted in accordance with the doctrine of equivalents.

What is claimed is:

1. An electrical appliance energy consumption control method comprising:
   providing an electrical appliance coupled with a power distribution system;
   receiving electrical energy within the appliance from the power distribution system;
   consuming the received electrical energy using a plurality of loads of the appliance;
   monitoring electrical energy of the power distribution system; and
   adjusting an amount of consumption of the received electrical energy via one of the loads of the appliance from an initial level of consumption to an other level of consumption different than the initial level of consumption responsive to the monitoring.

2. The method of claim 1 further comprising:
   operating the one of the loads at the other level of consumption for a period of time; and maintaining an amount of consumption of the received electrical energy via an other of the loads of the appliance during at least a portion of the period of time.

3. The method of claim 1 wherein the monitoring comprises monitoring an electrical characteristic of the electrical energy of the power distribution system.

4. The method of claim 3 wherein the adjusting comprises adjusting responsive to the electrical characteristic triggering a threshold.

5. The method of claim 4 further comprising varying the threshold at a plurality of different moments in time.

6. The method of claim 4 further comprising varying the threshold at a plurality of different moments in time corresponding to respective power-up operations of the appliance at different moments in time.

7. The method of claim 3 wherein the monitoring comprises monitoring the frequency of the electrical energy.

8. The method of claim 7 wherein the monitoring comprises monitoring frequency of the electrical energy distributed to the appliance by the power distribution system.

9. The method of claim 1 wherein the monitoring comprises monitoring using control circuitry proximately located with respect to the appliance.

10. The method of claim 9 wherein the control circuitry resides within the appliance.

11. The method of claim 9 wherein the receiving comprises receiving the electrical energy via a node of the power distribution system, and the controller monitors the electrical energy at the node.

12. The method of claim 1 wherein the adjusting comprises initial adjusting, and further comprising other adjusting the amount of consumption of the received electrical energy via the one of the loads to the initial level of consumption after the initial adjusting.

13. The method of claim 12 further comprising determining a variable length of time after the adjusting, and the other adjusting is responsive to the determining.

14. The method of claim 13 wherein the determining comprises determining a random length of time.

15. The method of claim 13 wherein the determining comprises determining the variable length of time according to a statistical distribution.

16. The method of claim 1 wherein the adjusting comprises adjusting the amount of the consumption to the other level of the consumption at a plurality of different moments in time, and further comprising operating the one of the loads at the other level of consumption for a plurality of different lengths of time at the respective different moments in time.

17. The method of claim 1 wherein the amount of the consumption during the other level of consumption is less than the amount of the consumption during the initial level of consumption.

18. The method of claim 1 wherein the one of the loads consumes substantially none of the received electrical energy during the other level of consumption.

19. The method of claim 1 wherein the adjusting comprises sending a control signal from a controller to the one of the loads.

20. The method of claim 1 further comprising:
providing an override indication after the adjusting; and
further adjusting the amount of consumption of the received electrical energy via the one of the loads to the initial level of consumption responsive to the override indication.

21. The method of claim 1 wherein the adjusting comprises adjusting the amount of consumption of the received electrical energy via a compressor of a compressor system in a hot gas bypass operation.

22. The method of claim 1 wherein the receiving comprises receiving within the appliance located at a customer location, and at least one of the monitoring and controlling comprises using control circuitry located at the customer location.

23. The method of claim 22 wherein the control circuitry comprises a system controller.

24. The method of claim 22 wherein the control circuitry comprises control circuitry of a power management device coupled with the appliance.

25. The method of claim 22 wherein the control circuitry comprises control circuitry of the appliance.

26. The method of claim 1 wherein the providing the appliance comprises providing an HVAC system.

27. The method of claim 26 wherein the adjusting comprises adjusting a temperature set point of a thermostat of the HVAC system.

28. The method of claim 26 wherein the adjusting comprises controlling cooling equipment of the HVAC system.

29. The method of claim 26 wherein the adjusting comprises controlling heating equipment of the HVAC system.

30. The method of claim 26 wherein the adjusting comprises controlling a damper of the HVAC system.

31. The method of claim 26 wherein the adjusting comprises controlling a fan of the HVAC system.

32. The method of claim 26 wherein the adjusting comprises canceling a defrost operation of a heat pump of the HVAC system.

33. The method of claim 1 wherein the providing the electrical appliance comprises providing a clothes dryer.

34. The method of claim 31 wherein the adjusting comprises adjusting the amount of consumption of the received electrical energy via one of the loads of the clothes dryer comprising a heating element.

35. The method of claim 34 wherein the adjusting comprises reducing an amount of current of the electrical energy applied to the heating element.

36. The method of claim 1 wherein the providing the electrical appliance comprises providing a clothes washer.

37. The method of claim 36 wherein the adjusting comprises adjusting the amount of consumption of the received electrical energy via the one of the loads of the clothes washer comprising a heating element.

38. The method of claim 36 wherein the adjusting comprises adjusting the amount of consumption of the received electrical energy via the one of the loads of the clothes washer comprising an agitator motor.

39. The method of claim 1 wherein the providing the electrical appliance comprises providing a water management system of one of a spa and a pool.

40. The method of claim 39 wherein the adjusting comprises adjusting a temperature set point of the water management system.

41. The method of claim 39 wherein the adjusting comprises adjusting water circulation operations of the water management system using the one of the loads comprising a water circulation motor.

42. The method of claim 39 wherein the adjusting comprises adjusting water heating operations of the water management system using the one of the loads comprising a water heating element.

43. The method of claim 1 wherein the providing the electrical appliance comprises providing a dish washer.

44. The method of claim 43 wherein the adjusting comprises adjusting water heating operations of the dishwasher using the one of the loads comprising a water heating element.

45. The method of claim 43 wherein the adjusting comprises adjusting drying operations of the dishwasher using the one of the loads comprising a forced air heating element.

46. The method of claim 43 wherein the adjusting comprises adjusting operations of one of the loads comprising a water pump.

47. The method of claim 1 wherein the providing the electrical appliance comprises providing the electrical appliance having a plurality of modes of operation including an energy saving mode of operation, and the adjusting comprises adjusting the appliance to operate in the energy saving mode.

48. The method of claim 47 wherein the electrical appliance comprises a personal computer system.

49. The method of claim 48 wherein the adjusting comprises adjusting a clock speed of control circuitry of the personal computer system.

50. The method of claim 1 wherein the providing the electrical appliance comprises providing a hot water heater.

51. The method of claim 50 wherein the adjusting comprises adjusting a temperature set point of a thermostat of the hot water heater.

52. The method of claim 50 wherein the adjusting comprises adjusting the temperature set point to one of a plurality of set points corresponding to a plurality of respective values of the electrical characteristic.

53. The method of claim 50 wherein the adjusting comprises adjusting water heating operations using the one of the loads comprising a water heating element.

54. The method of claim 1 wherein the providing the electrical appliance comprises providing a refrigerator.

55. The method of claim 54 wherein the adjusting comprises adjusting a temperature set point of a thermostat of the refrigerator.

56. The method of claim 54 wherein the adjusting comprises adjusting defrost operations of the refrigerator using the one of the loads comprising a heater configured to heat coils of the refrigerator.

57. The method of claim 56 wherein the adjusting comprises adjusting a time of the defrost operations.

58. The method of claim 54 wherein the adjusting comprises adjusting anti-sweat operations of the refrigerator using the one of the loads comprising a heater configured to heat an exterior portion of a cabinet of the refrigerator.

59. The method of claim 54 wherein the adjusting comprises adjusting interior air circulation operations of the refrigerator using the one of the loads comprising a fan.

60. The method of claim 54 wherein the adjusting comprises adjusting cooling operations of the refrigerator using the one of the loads comprising a compressor.

61. The method of claim 60 wherein the adjusting comprises varying a speed of the compressor.

62. The method of claim 60 wherein the adjusting comprises performing a hot gas bypass operation.

63. The method of claim 54 wherein the providing comprises providing the refrigerator comprising a multi-stage refrigerator having a plurality of cooling stages, and the adjusting comprises adjusting to operate at less than the available number of cooling stages.

64. An electrical appliance energy consumption control method comprising:

providing an electrical appliance coupled with a power distribution system, the appliance comprising a plurality of loads;

receiving electrical energy within the appliance from the power distribution system;

operating the appliance at a normal mode of operation wherein one of the loads consumes a first amount of electrical energy;

monitoring an electrical characteristic of electrical energy of the power distribution system; and responsive to the monitoring, operating the appliance at an other mode of operation wherein the one of the loads consumes a second amount of electrical energy different than the first amount of electrical energy.

65. The method of claim 64 wherein the monitoring comprises monitoring the electrical characteristic comprising frequency of the electrical energy.

66. The method of claim 65 wherein the monitoring comprises monitoring the frequency of the electrical energy distributed to the appliance by the power distribution system.

67. An electrical energy consumption system comprising:

a power interface configured to receive electrical energy of the power distribution system;

a plurality of loads coupled with the power interface and configured to consume the received electrical energy; and control circuitry configured to monitor an electrical characteristic of the electrical energy of the power distribution system and to vary an amount of consumption of the received electrical energy via one of the loads responsive to the monitoring.

68. The system of claim 67 wherein the control circuitry is located proximate to the loads.

69. The system of claim 67 wherein the power interface is configured to receive the electrical energy from a node of the power distribution system and the control circuitry is coupled with the node.

70. The system of claim 69 wherein the control circuitry is configured to monitor the electrical characteristic of the electrical energy received via the node.

71. The system of claim 67 wherein the loads comprise loads of a single appliance.

72. The system of claim 71 wherein an other of the loads receives a constant supply of electrical energy before and after the varying.

73. The system of claim 67 wherein the control circuitry is configured to monitor the electrical characteristic comprising frequency of the electrical energy.

74. The system of claim 73 wherein the control circuitry is configured to monitor the frequency of the electrical energy received by the power interface from the power distribution system.

75. The system of claim 67 wherein the control circuitry resides within a housing of an appliance which comprises the plurality of loads.

76. A compressor system comprising:

a compressor configured to compress a fluid;

a condenser configured to condense the fluid;

an evaporator configured to evaporate the fluid; and control circuitry configured to monitor electrical energy supplied to the compressor and to control short circuiting of the condenser and the evaporator responsive to the monitoring to reduce an amount of electrical energy consumed by the compressor compared with an other operational mode.

77. The system of claim 76 wherein the control circuitry is configured to monitor the electrical energy received at a physical location of the compressor.

78. An HVAC system comprising:
equipment configured to consume a first amount of electrical energy during operations to adjust a temperature of an area associated with the HVAC system; and
control circuitry configured to monitor the electrical energy supplied to the HVAC system at a physical location of the HVAC system, and to control the equipment to operate in a mode wherein a second amount of electrical energy is consumed by the HVAC system less than the first amount.

79. The system of claim 78 wherein the control circuitry is configured to control the equipment responsive to the monitoring.

80. The system of claim 79 wherein the control circuitry is configured to monitor an electrical characteristic of the electrical energy to monitor the electrical energy.

81. The system of claim 80 wherein the control circuitry is configured to monitor the electrical characteristic comprising frequency of the electrical energy.

82. A clothes dryer comprising:
a heating element configured to control a temperature of a compartment of the clothes dryer configured to dry clothes;
a tumbler motor configured to rotate the clothes in the compartment; and
control circuitry configured to monitor electrical energy provided to at least one of the heating element and the tumbler motor and to control at least one of the heating element and the tumbler motor to operate in a mode of operation wherein a reduced amount of electrical energy is consumed by the clothes dryer compared with an other operational mode and responsive to the monitoring of the electrical energy.

83. The dryer of claim 82 wherein the control circuitry is configured to monitor the electrical energy provided at a physical location of the clothes dryer.

84. A clothes washer comprising:
a heating element configured to control a temperature of water used to wash clothes using the clothes washer;
an agitator motor configured to agitate the clothes being washed; and
control circuitry configured to monitor electrical energy provided to at least one of the heating element and the agitator motor and to control at least one of the heating element and the agitator motor to operate in a mode of operation wherein a reduced amount of electrical energy is consumed by the clothes washer compared with an other operational mode and responsive to the monitoring of the electrical energy.

85. The washer of claim 84 wherein the control circuitry is configured to monitor the electrical energy provided at a physical location of the clothes washer.

86. A water management system comprising:
a heating element configured to control a temperature of water within an associated reservoir;
a circulation motor configured to circulate water within the reservoir; and
control circuitry configured to monitor electrical energy provided to at least one of the heating element and the circulation motor and to control at least one of the heating element and the circulation motor to operate in a mode of operation wherein a reduced amount of electrical energy is consumed by the water management system compared with an other operational mode and responsive to the monitoring of the electrical energy.

87. The system of claim 86 wherein the control circuitry is configured to monitor the electrical energy provided at a physical location of the water management system.

88. A dish washer comprising:
a water heating element configured to adjust a temperature of water used to wash dishes using the dish washer;
a forced air heating element configured to adjust a temperature of air used to dry the dishes using the dish washer; and
control circuitry configured to monitor electrical energy provided to at least one of the water heating element and the forced air heating element and to control at least one of the water heating element and the forced air heating element to operate in a mode of operation wherein a reduced amount of electrical energy is consumed by the dish washer compared with an other operational mode and responsive to the monitoring of the electrical energy.

89. The dish washer of claim 88 further comprising a water pump, and wherein the control circuitry is configured to control the water pump to operate in a mode of operation wherein a reduced amount of electrical energy is consumed by the water pump compared with an other operational mode of the water pump.

90. The dish washer of claim 88 wherein the control circuitry is configured to monitor the electrical energy provided at a physical location of the dish washer.

91. A personal computer system comprising:
a component of the personal computer system configured to operate in an energy saving mode; and
control circuitry configured to monitor electrical energy provided to the component of the personal computer system and to control the component to operate in the energy saving mode wherein a reduced amount of electrical energy is consumed by the personal computer system compared with an other operational mode, and wherein the controlling is responsive to the monitoring of the electrical energy.

92. The system of claim 91 wherein the control circuitry is configured to monitor the electrical energy provided at a physical location of the personal computer system.

93. The system of claim 91 wherein the component comprises a peripheral component.

94. The system of claim 91 wherein the component comprises a display.

95. The system of claim 91 wherein the component comprises a microprocessor of the control circuitry.

96. A water heater comprising:
a water heating element configured to control a temperature of water within a reservoir of the water heater; and
control circuitry configured to monitor electrical energy provided to the water heating element at a physical location of the water heater, and wherein the control circuitry is configured to control the water heating element to operate in a mode of operation wherein a reduced amount of electrical energy is consumed by the water heater compared with an other operational mode and responsive to the monitoring of the electrical energy.

97. The water heater of claim 96 wherein the control circuitry is configured to monitor an electrical characteristic of the electrical energy to monitor the electrical energy.

98. The water heater of claim 97 wherein the control circuitry is configured to monitor the electrical characteristic comprising frequency of the electrical energy.

99. A refrigerator comprising:
- a plurality of components configured to perform operations with respect to refrigeration of goods within the refrigerator; and
- control circuitry configured to monitor electrical energy provided to at least one of the components and to control at least one of the components to operate in a mode of operation wherein a reduced amount of electrical energy is consumed by the refrigerator compared with an other operational mode and responsive to the monitoring of the electrical energy.

100. The refrigerator of claim 99 wherein the control circuitry is configured to monitor the electrical energy provided at a physical location of the refrigerator.

101. The refrigerator of claim 99 wherein the at least one component comprises a thermostat.

102. The refrigerator of claim 99 wherein the at least one component comprises a heating element.

103. The refrigerator of claim 99 wherein the at least one component comprises a circulation fan.

104. The refrigerator of claim 99 wherein the at least one component comprises a compressor.

* * * * *

UNITED STATES PATENT AND TRADEMARK OFFICE
CERTIFICATE OF CORRECTION

| | | |
|---|---|---|
| PATENT NO. | : 7,010,363 B2 | Page 1 of 1 |
| APPLICATION NO. | : 10/462307 | |
| DATED | : March 7, 2006 | |
| INVENTOR(S) | : Donnelly et al. | |

It is certified that error appears in the above-identified patent and that said Letters Patent is hereby corrected as shown below:

Title Page, Inventors, line 8, please delete "Boberly-Bartis" after "Anne Marie" and insert --Borbely-Bartis--.

Title page 2, "FOREIGN PATENT DOCUMENTS", please delete GB 2361 114A 10/2001" after "EP 1 372 238 A1 12/2003" and insert --GB 2361 118A 10/2001--.

Col. 7, line 16, please delete "of" after "operation" and insert --of)--.

Col. 14, line 35, claim 34, please delete "31" after "claim" and insert --33--.

Signed and Sealed this

Twenty-second Day of August, 2006

JON W. DUDAS
*Director of the United States Patent and Trademark Office*